US012296413B2

(12) United States Patent
Gilad et al.

(10) Patent No.: US 12,296,413 B2
(45) Date of Patent: May 13, 2025

(54) SPOT WELDING APPARATUS

(71) Applicant: WELDOBOT LTD., Eyal (IL)

(72) Inventors: Menachem Gilad, Eyal (IL); Alfonso Rubin, Eyal (IL); Tal Stein, Eyal (IL); Gadi Binyamini, Eyal (IL); Omer Einav, Eyal (IL)

(73) Assignee: WELDOBOT LTD., Eyal (IL)

( * ) Notice: Subject to any disclaimer, the term of this patent is extended or adjusted under 35 U.S.C. 154(b) by 1213 days.

(21) Appl. No.: 17/047,700

(22) PCT Filed: Apr. 15, 2019

(86) PCT No.: PCT/IL2019/050423
§ 371 (c)(1),
(2) Date: Oct. 15, 2020

(87) PCT Pub. No.: WO2019/202589
PCT Pub. Date: Oct. 24, 2019

(65) Prior Publication Data
US 2021/0154760 A1  May 27, 2021

(30) Foreign Application Priority Data
Apr. 16, 2018  (IL) .......................................... 258747

(51) Int. Cl.
*B23K 9/007* (2006.01)
*B23K 9/16* (2006.01)
(Continued)

(52) U.S. Cl.
CPC ................ *B23K 9/007* (2013.01); *B23K 9/16* (2013.01); *B23K 10/02* (2013.01); *B23K 10/022* (2013.01);
(Continued)

(58) Field of Classification Search
CPC .......... B23K 9/007; B23K 9/16; B23K 10/02; B23K 10/022; B23K 28/02; B23K 37/04;
(Continued)

(56) References Cited

U.S. PATENT DOCUMENTS 2,430,900 A * 11/1947 Wetzler .................. B23Q 3/069
269/238
3,938,797 A * 2/1976 Frederick ........... B23K 37/0408
269/239
(Continued)

FOREIGN PATENT DOCUMENTS

CN        106271140 A    1/2017
JP        S51146351 A    12/1976
(Continued)

OTHER PUBLICATIONS

International Search Report for PCT/IL2019/050423 mailed Jul. 29, 2019.
(Continued)

*Primary Examiner* — Dana Ross
*Assistant Examiner* — Joe E Mills, Jr.
(74) *Attorney, Agent, or Firm* — The Roy Gross Law Firm, LLC; Roy Gross

(57) ABSTRACT

The invention pertains to a welding apparatus, particularly to a spot sa welding apparatus which utilizes a single welding electrode/torch to weld vertically adjacent metallic sheets or plates together. The apparatus comprises a MAG welding apparatus with a welding torch and shielding inert or semi-inert gases gas source configured to protect the welded working place, an apparatus for creating holes in at least one of the welded metallic sheets and at least one frame part for assembling the MAG welding apparatus and apparatus for creating holes.

20 Claims, 11 Drawing Sheets

(51) Int. Cl.
  *B23K 10/02* (2006.01)
  *B23K 28/02* (2014.01)
  *B23K 37/04* (2006.01)
  *B23K 103/04* (2006.01)

(52) U.S. Cl.
  CPC .............. *B23K 28/02* (2013.01); *B23K 37/04* (2013.01); *B23K 2103/04* (2018.08)

(58) Field of Classification Search
  CPC .... B23K 2103/04; B23K 9/323; B23K 26/38; B23K 37/0408
  See application file for complete search history.

(56) References Cited

U.S. PATENT DOCUMENTS

| | | | | |
|---|---|---|---|---|
| 4,392,641 | A * | 7/1983 | Dearman | B23K 37/04 269/49 |
| 5,324,913 | A * | 6/1994 | Oberg | B23K 26/037 219/121.64 |
| 5,897,796 | A * | 4/1999 | Forrest | B23K 33/008 29/243.58 |
| 6,934,014 | B1 * | 8/2005 | Kleinhuber | G02B 27/14 250/201.3 |
| 2007/0175869 | A1 * | 8/2007 | Auger | B23K 11/255 219/110 |
| 2011/0198317 | A1 * | 8/2011 | Lin | B23K 26/242 219/136 |
| 2017/0173730 | A1 * | 6/2017 | Konrad | B25J 9/1697 |

FOREIGN PATENT DOCUMENTS

| | | | |
|---|---|---|---|
| JP | S58-119470 A | | 7/1983 |
| JP | 2000271748 A | * | 10/2000 |
| JP | 2004130346 A | | 4/2004 |
| JP | 2005046886 A | | 2/2005 |
| JP | 2006035256 A | | 2/2006 |
| JP | 2015120186 A | * | 7/2015 |
| JP | 2015186809 A | | 10/2015 |
| JP | 2017061870 A | | 10/2015 |

OTHER PUBLICATIONS

Written Opinion for PCT/IL2019/050423 mailed Jul. 29, 2019.
English translation of Office Action for Japanese Patent Application No. 2020-558507, dated Feb. 8, 2023, 11 pp.
Office Action for Japanese Patent Application No. 2020-558507, dated Oct. 24, 2023, 14pp.

* cited by examiner

Configuration:

TIMING:

Configuration:

TIMING:

Motion Example:

TIMING:

SPOT WELDING APPARATUS

TECHNICAL FIELD

The present invention pertains to a welding apparatus, particularly to a spot welding apparatus which utilizes a single welding electrode/torch to weld vertically adjacent metallic sheets or plates together.

BACKGROUND

Spot welding is a process in which contacting metal surface points are joined by the heat obtained from resistance to electric current. The related welding setup reported in the prior art comprises at least two metal work-pieces held together under pressure exerted by at least two electrodes. The related method utilizes at least two electrodes which concentrate welding current into a small spot and simultaneously clamp the sheets together. The amount of heat energy which is delivered to the spot is determined by the resistance between the electrodes, which depends also by the magnitude and duration of the current which is defined by the material properties, and thickness, and also by the type of the welding electrodes. Welding faults can result in this method from applying too little energy and heat that does not melt the metal or results in a poor weld. Other faults result from applying too much energy that melts too much metal, ejects molten material, and makes a hole rather than a weld. Another problem is that spot welding requires at least two welding electrodes and high accuracy in the alignment between them at the two sides of the two welded metallic sheets. Prior art welding methods suffer from several unwanted side effects that result from misalignment of the welding electrodes, which can degrade their welding reliability and integrity. Other degradation impactors on the welding quality may be driven from several other parameters such as parasitic resistance and local geometrical non-uniformities in the welded bulk and surface of the metallic spot area, including non-uniformities and variations in the local electrical properties of the metallic workpieces and related metallic sheets. These non-uniformities may result from a poor and or non-conformal metallic layers or covers which can further result in unstable local conductivity of the welded layers, shifting the welding current in ranges of too high or too low values. This in turn degrades the welding quality. Moreover, in many cases where a spot welding is required, the accessibility to the welded area is enabled only from one side of the metallic workpiece that comprises two sheets.

It is, therefore, an object of the present invention, to provide efficient and reliable apparatus and method which utilizes only a single electrode for spot welding.

It is yet another object of the present invention, to provide a spot welding method and apparatus which are able to weld adjacent metallic sheets by accessing only from one side, which is highly required upon no accessibility to the welded sheet surfaces.

It is yet another object of the present invention to provide a robust spot welding method and apparatus with low sensitivity to geometrical and electrical non-uniformities and artifact at the welded spot area and gap between the vertically separated welded metallic sheets.

This and other objects and embodiments of the invention shall become apparent as the description proceeds.

SUMMARY

In one embodiment, the present invention provides means and methods for spot or stitch welding of two or more metallic sheets by using a combination of both plasma and MAG technologies to weld the two sheets on one side. In another embodiment of the present invention, the two technologies are physically separated. In some embodiments, the two technologies are combined into a single Hybrid Torch by using a combination of both plasma and MAG arcs working simultaneously to weld the two sheets on one side. In another embodiment of the present invention, a sequence of operations and specific geometry design enables the corresponding process.

Apparatus

In one embodiment of the present invention, the spot welding apparatus comprises:
 a MAG welding apparatus comprising a welding torch;
 a gas source emitting shielding inert or semi-inert gases which protect the welded working place;
 a plasma source apparatus for creating holes through at least one of the welded metals;
 at least one frame part for assembling the components of the spot welding apparatus.

In another embodiment of the present invention, the spot welding apparatus comprises a foot pressure apparatus for applying pressure before and during the welding process in the welded metallic sheets.

In still another embodiment of the present invention, the welding foot pressure apparatus comprises handle and foot pressure components wherein the foot pressure components further comprise at least one metallic finger, which is connected to the handle component at its edge. In another particular embodiment of the present invention, the foot pressure component comprises two parallel fingers, further connected at their distal edge with a horizontally positioned element relative to the fingers, thereby creating a rectangular shape aperture hole which enables a free passage for plasma apparatus output and welding torch heat.

In a further embodiment of the present invention, the spot welding apparatus is utilized for a workpiece comprising at least two metallic sheets separated vertically by a certain gap. In still a further embodiment of the present invention, the welded metallic workpiece comprises at least two metallic sheets ($10a$, $10b$-$10n$) with related widths ($h_1$, $h_2$, -$h_n$) separated by a vertical separation gap, marked as ($GAP_1$, $GAP_2$-$GAP_{n-1}$).

In another embodiment of the present invention, the welding spot apparatus further comprises an alignment apparatus which is configured to align the axes of the MAG welding apparatus and plasma source apparatus that pass through the foot pressure apparatus.

In another embodiment of the present invention, said frame part comprises a base element, which assembles a MAG welding apparatus, a foot pressure apparatus, and a dedicated frame part that carries the MAG welding apparatus, the plasma source apparatus and the alignment apparatus.

Method

The related spot welding method comprises the following main steps:
 Apply pressure with the pressure foot apparatus on at least two metallic sheets to adjust the gap between the welded sheets;
 Create initial hole with plasma on the top side sheet, to enable the MAG welding torch and electrode an access from one side to contact the top and bottom metallic sheets;
 Fill and weld the hole in a MAG welding process;
 Release the pressure on the metallic sheet with the foot pressure apparatus.

Features of Spot Welding Apparatus and Method

To improve the capabilities and performances of the Spot Welding Apparatus and Method, several additional aspects and embodiments of the present invention are provided with the following main features:

Welding Process Control and Time Sequence Algorithms:

In one embodiment of the present invention, the spot welding apparatus further comprises a controller module for the welding process and particularly the timing sequence of the MAG welding apparatus, the plasma source apparatus and the foot pressure apparatus.

In another particular embodiment of the present invention, the spot welding apparatus comprises a controller module that controls the process and executes pre-defined process algorithms. In a further embodiment of the present invention, said process algorithms comprise defined timing sequences for various welding parameters for a certain combination of different heat and/or energy input applied by the welding and plasma technologies.

In a further embodiment, the process algorithms take into account the separation gap between the metallic sheets and the required spot diameter and geometry. In a further embodiment of the present invention, the gap between every two welded sheets is controlled, modified, adjusted and optimized before, during and after the welding process.

In one embodiment of the present invention, the plasma source apparatus turn on is time scheduled to be the first in sequence at the beginning of the welding process.

In another embodiment of the present invention, several modules or apparatuses operate simultaneously, where their related operation time periods can partially or fully overlap. In another particular embodiment of the present invention, the end time of one operation of one specific apparatus is delayed or advanced with respect to the corresponding successive timing of the beginning of the successive operation of a reference apparatus.

In one preferred embodiment of the present invention, the timing sequence of the welding process with the MAG and plasma sources apparatuses comprises the following steps: The plasma source apparatus is turned on at T0.

The plasma source apparatus creates an opening over an operation time period of T_Plasma through the upper surface (10a) in case of two adjacent, vertically separated metallic sheets, through the n−1 top metallic sheets, in case of a stack comprising, n adjacent, vertically separated metallic sheets (10a-10n) or through the whole metallic stack (10a-10n).

The MAG welding apparatus is turned on at T0+ΔT1, where, ΔT1 is the corresponding time delay relative to the plasma.

The MAG welding apparatus process fills the hole and the gap with welding material, over an operation time period of T_MAG.

In a further embodiment of the present invention, the sequence, timing, scheduling, power input value and process parameters are optimized by the algorithm to provide a clean, strong and reliable weld.

In still a further embodiment of the present invention, the MAG welding apparatus is configured to rotate around the plasma apparatus axes to improve filling, spot integrity and strength and/or cover a large spot area.

In still another embodiment of the present invention, the MAG and plasma apparatuses are configured one relative each other for a "round shape" spot welding architecture, which is executed by the robotic carrier and control systems.

In one preferred embodiment of the present invention, the welding process comprises the time sequences of the MAG and plasma sources apparatuses and the robotic carrier velocity/speed, V, along the welded seam direction. In a further embodiment of the present invention, the welding process is configured for "linear stitch" welding architecture and comprises the following steps:

Locating the robot/system above the desired starting point.

Turning on the plasma source apparatus at T0 and throughout a time period of T_Plasma.

Creating an opening with the plasma source apparatus over an operation time period of T_Plasma through the upper surface (10a) of metallic sheet of two adjacent, vertically separated metallic sheets, through the n−1 top surfaces of adjacent, vertically separated metallic sheets for a stack comprising, n vertically separated metallic sheets (10a-10n) or through the whole metallic stack (10a-10n) of metallic sheets.

Turning on the MAG welding apparatus at T1=T0+ΔT1 and operating it over a time period T_MAG, where, ΔT1, is the time delay, relative to the plasma, marked also as $T_{V0}$.

Filling the opening and gap with the welding material using the MAG welding apparatus.

Moving the robot along the seam trajectory and operating over a time period T_Motion after a time delay, ΔT1.

Continuously operating the plasma source and MAG welding apparatuses, with the plasma source apparatus leading the MAG welding apparatus along the welding trajectory.

Stopping the plasma source apparatus upon arriving at end point.

Continuously moving the MAG welding apparatus and robot until time T_end and filling until the MAG welding apparatus is positioned at the end point and the robot travels the Delta distance, Δ.

Optionally, optimizing the sequence, timing, power input and process parameters by the algorithm to provide a clean, strong and reliable weld.

In a further preferred embodiment of the present invention, one or several of the following synchronization rules and corresponding relations between the different time scales detailed above are applied to the welding process sequence and related apparatuses.

i. ΔT1=T_V0=T_M0.
ii. T_MAG=T_Motion.
iii. T_MAG=T_Plasma.
iv. T_Plasma=T_Motion.
v. T_Plasma+Tend=T_MAG+TM0.
T_Plasma+Tend=T_Motion+TV0.

In another preferred embodiment of the present invention, the welding process times sequences of the MAG and the plasma sources apparatuses and the robotic carrier velocity/speed, V, along the welded seam direction. The welding process timing sequences of the welding MAG and the plasma sources apparatuses are designed for "linear stitch" welding architecture and comprise the following steps:

The robot/system is located above the desired starting point.

The plasma source apparatus is turned on at T0, operating over a time period of T_Plasma.

The robot starts to move at T0+$T_{V0}$ along the seam trajectory operating over a time period of T_Motion, where $T_{V0}$ is the delay time of the robot movement with respect to the turn on time of the plasma The plasma source apparatus creates an opening hole over a time operation T_Plasma, through the upper surface of the top metallic sheet (10*a*) for two adjacent, vertically separated metallic sheets, through the n−1 top metallic sheets for a stack comprising, n adjacent, vertically separated metallic sheets (10*a*-10*n*) or through the whole metallic stack (10*a*-10*n*).

The MAG welding apparatus is turned on at T1 and operates over a period of T_MAG, where ΔT1, is the delay time of the MAG turn on time with respect to the plasma turn on operation time, i.e. T1=T0+ΔT1.

The MAG welding apparatus fills the opening and the gap with welding material.

The plasma source apparatus and MAG welding apparatus continue to operate, where the plasma source apparatus leads the MAG welding apparatus, along the welding trajectory.

The plasma source apparatus stops upon arriving at end point.

The MAG welding apparatus and robot continue to move further over a time period T_end, the MAG apparatus fills the hole until positioned at the end point and the robot travels the linear stitch seam trajectory with longitudinal diameter of delta, Δ.

Optionally, the sequence, timing, power input and process parameters are optimized by the algorithm to provide a clean, strong and reliable weld.

In a further preferred embodiments of the present invention, one or several of the following relations that determine synchronization rules between the different time scales are applied to the welding process sequence:
  i. T1=T0+ΔT1.
  ii. T_MAG=T_Plasma.
  iii. T_Plasma+T_end=T_MAG+ΔT1.
  iv. T_Plasma+T_end=T_Motion.

In another preferred embodiment of the present invention, the welding process time sequences comprise the time sequences of the welding MAG and plasma sources apparatuses and robotic carrier velocity/speed, V, along the welded seam direction for a "linear stitch" welding architecture that comprises the following steps:

The robot/system is located above the desired start point over a time operation period of T_Plasma.

The plasma is turned on at T0.

The plasma creates an opening in the metal sheets.

The robot moves along the seam trajectory until a time T2, over a time operation period of T_Motion.

The MAG is turned on at T1=T0+ΔT1 and operates over time operation period of T_MAG, where ΔT1, is the delay time of the MAG turn on time with respect to the plasma turn on operation time and it depends mainly on, d, which is the inter-distance between the MAG and plasma contact point on the workpiece and the robot velocity, V.

The MAG process fills the opening and gap with welding material.

The plasma and MAG continue to operate (plasma leading the MAG) along the trajectory.

The plasma stops upon arriving at end point.

The MAG and robot continue to move and fill until the robot travels the distance d and the MAG is positioned at the end point.

Optionally, the sequence, timing, power input and process parameters are optimized by the algorithm to provide a clean and strong weld.

In a further preferred embodiment of the present invention, one or several of the following relations between the previous different time scales can be forced on/applied to the welding process sequences.

In a further preferred embodiment of the present invention, one or several of the following synchronization relations between the different time scales detailed above are applied to the welding process sequence:
  i. ΔT1=T_Plasma+T_Motion.
  ii. T2=T0+T_Plasma.

Programmable Foot Pressure Apparatus:

In one embodiment of the present invention, the spot welding apparatus comprises a programmable foot pressure apparatus which is configured to apply a controlled applied force on the two welded metallic sheets.

In a further embodiment of the present invention, an at least one pressure or force sensor is integrated with the foot controller apparatus or other element of the spot welding apparatus, providing a feedback data on the pressure parameters applied by the foot pressure apparatus.

In still a further embodiment of the present invention, the spot welding apparatus comprises a plurality of optical sensors and imaging apparatuses, such as a camera, to image and calculate the welded seam geometrical diameters with and without an applied pressure. These features and related embodiments of the present invention are provided to correctly model and asses the impact of the applied pressure on the welding process and the seam properties throughout the welding process and evaluate the risk of unwanted side effects which may be driven by the applied external pressure. The related modeling and assessment are further used to optimize the programmable applied pressure during the welding process.

A Controlled Threshold Separation Gap of Several Millimeters Between the Welded Metal Sheets:

In another embodiment of the present invention, the welding spot apparatus allows an access to the welded workpiece from one side of a welded sheet metal, where the vertical gap separation is limited to a gap of up to a threshold separation gap of several millimeters. In a further particular embodiment of the present invention, the threshold gap value ranges varies from sub-millimeter gap size to 10 mm, where generally the level of difficulty of the spot welding operation is inversely proportional to the welding vertical separation gap. In a further embodiment of the present invention, mechanical pressure is applied vertically on the metallic sheets before, during and after the welding spot operation, in order to reduce the vertical separation gap magnitude, hence enabling or facilitating the spot welding process. In a further preferred embodiment of the present invention, the mechanical pressure is applied on the metallic stack of sheets at its top side, along the top metallic sheet, with the mechanical foot pressure apparatus with at least one metallic finger.

In a further embodiment of the present invention, an at least one distance sensor is integrated with the welding spot apparatus, providing a feedback on vertical separation gap between the metallic sheets in the vicinity of the welded area. This distance sensor provides gap measurement before, during and after completion of the welding process with and without the applied pressure by the foot controller.

Flex-Joint to Provide Relative Motion Between Torch and Pressure Foot:

In another embodiment of the present invention, a plurality of flex joints are integrated with the foot pressure apparatus and/or MAG welding apparatus to enable a relative motion between the foot apparatus and/or welding torch apparatuses.

Circular or Spiral Spot Weld Motion (Robot Based):

In still another embodiment of the present invention, a circular or spiral welding motion is applied to the welding spot by a dedicated robotic controlled motion. In a further embodiment of the present invention, any predefined motion is applied to the spot welding by said robotic means.

Rotation and Translation of the Spot Welding Apparatus Components:

In one embodiment of the present invention, the MAG welding apparatus is configured to rotate around the plasma axes to improve filling and spot integrity and strength or cover a large spot area.

In another embodiment of the present invention, the spot welding apparatus further comprises transport means, such as an arm or other vehicle, which are mechanically attached to the MAG welding apparatus, plasma source apparatus and foot pressure apparatus, which are controlled and manipulated by robotic means enabling their lateral translation and/or rotational movements.

In one embodiment of the present invention, the MAG welding and plasma source apparatuses are configured to rotate in a plurality of frequencies and relative phases along the direction of the robotic transport means.

In another embodiment of the present invention, the plasma source apparatus is configured to rotate in direction of the robotic transport means in a plurality of phases and frequencies. The MAG welding apparatus is configured to rotate in a plurality of frequencies and phases along the vertical direction with respect to the robotic transport means.

In still another embodiment of the present invention, the MAG welding apparatus is configured to rotate around the plasma axes in a configuration designed for a "linear stitch" welding architecture to improve the filling and spot integrity and strength and/or cover a large spot area. In another embodiment of the present invention, the MAG welding apparatus is configured to rotate in a certain frequency around the vertical direction with respect to the plasma axis, or around another axis which is not parallel to the plasma axis, while moving in a velocity, V, along the welded seam. In yet another embodiment of the present invention, designed for a "round spot" welding architecture, both the MAG welding and the plasma source apparatuses are configured to rotate around the welded spot, where their axes are positioned to coincide at the center of the vertical gap, between parallel, adjacent metallic sheets, which are going to be welded.

Plasma Apparatus—S/W (Software/Hardware) Design

In one aspect of the present invention, the optimization of the spot welding apparatus requires a fast response time for all spot welding modules, which are listed below.

These modules are integrated with the spot welding apparatus to implement the suggested solution and welding process ("spot welding"). A "fast" response time is required, and accordingly the following timing and response of the improved timing of the modules:

Pilot arc
Main arc
Current source (Miller Power Source for example)
Gas distribution unit (shield+Argon)

In another embodiment of the present invention, the spot welding apparatus comprises an apparatus for creating holes in metallic sheets, where the plasma module is one example thereof. Accordingly, in addition to the plasma apparatus, such apparatus for creating holes on one side of adjacent metallic sheets is selected from high power laser cutting apparatus, a thermal drilling apparatus, a mechanical drilling apparatus and a combination of thereof.

In one embodiment of the present invention, the MAG apparatus welding head comprises various geometries yielding a spot with different geometrical shapes. In a further embodiment of the present invention, the MAG plasma head is configured to rotate simultaneously on the same spot or successive spots, wherein the plasma source can move laterally along the welded seam or different directions.

In one embodiment of the present invention, the apparatus for creating holes further comprises at least one sensor for the metal etch processing, thereby enabling to avoid over or under etching of the metallic sheets stop the metal etch process on the bottom metallic sheet. In a further embodiment of the present invention, the sensor for the metal etch processing is an optical sensor, an electrical resistive, capacitive or inductive sensor, an imaging sensor, with or without comparison to a reference image of the welded spot, a sensor based on contact or contactless tip which measures the surface electrical forces or any other sensor which can characterize metal etch processing of the hole inside the metallic workpiece comprising a stack of metallic sheets.

In one embodiment of the present invention, the spot welding apparatus further comprises at least one sensor for checking the welded spot shapes, color, metallic layer, topography and other relevant properties, which are used as indicators of the welded spot and welding process quality, integrity, and reliability. In a further embodiment of the present invention, the sensor can be an optical sensor, an electrical resistive, capacitive or inductive sensor, an imaging sensor, with or without comparison to a reference image of the welded spot, a sensor based on contact or contactless tip which measures the surface electrical forces or any other sensor which can measure the welded spot and welding process quality, integrity, and reliability.

DETAILED DESCRIPTION OF THE DRAWINGS

A detailed description of the spot apparatus and method are provided in this section. The following part describes particular examples and preferred embodiments of the present invention with reference to the accompanying drawings and without limiting the scope of the present invention.

Figure 1A:
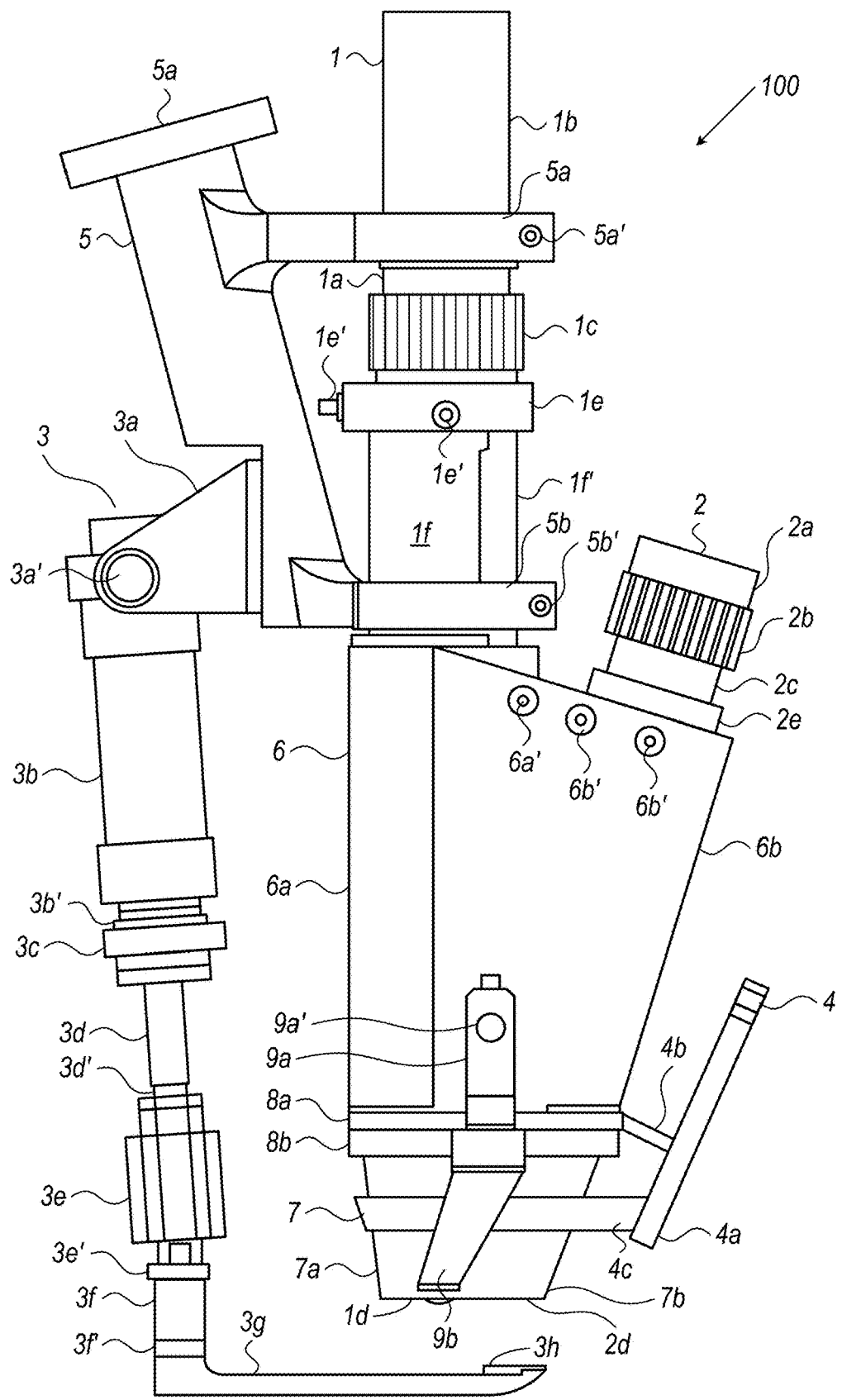
FIGS. 1A-B illustrate side and perspective zoom-in views of the spot welding apparatus, including outlets and foot pressure apparatus.
Figure 1B:
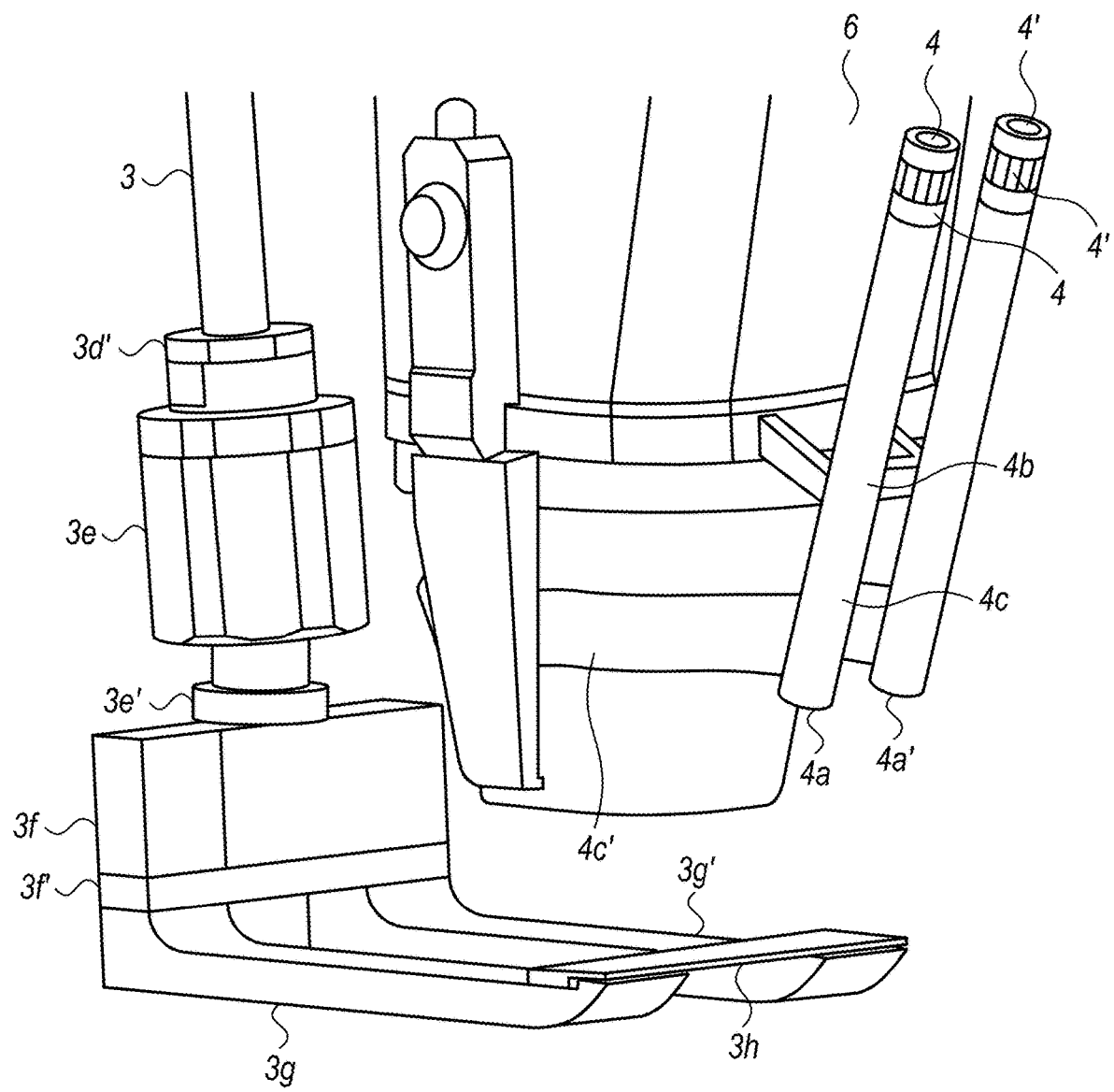

FIG. 1A Illustrates a side-view of the spot welding apparatus (100) in one embodiment of the present invention. FIG. 1B illustrates a side-perspective view zoom-in image of the spot welding apparatus. The spot welding apparatus comprises the following main modules: an inlet and related adaptor for plasma source apparatus (1) for creating holes in the welded metallic sheet(s); an inlet and related adaptor for the MAG (Metal Inert Gas) welding apparatus (2) comprising a welding torch and a gas source for shielding with inert or semi-inert gases which protect the welded working place; a foot pressure apparatus (3); Two inlets and outlets for circulating water for cooling the MAG welding head element (4, 4'). These modules are assembled together with a dedicated carrier frame part (5) comprising a dual purpose base element, which is configured as a holding device with a mechanical connection with a robotic handling arm, a vehicle or another transport means, and which further assembles the plasma source apparatus (1) and the foot pressure apparatus (3), and an additional frame part which assembles and carries the plasma source apparatus (1), the MAG (Metal Inert Gas) welding apparatus (2) and the cooling water circulating pipes entry elements (4, 4') together.

The assembly of the spot welding apparatus (100) is specially configured to assemble and align the plasma source and MAG welding apparatuses on target in the welding geometrical location, wherein the foot pressure apparatus (3) is positioned several millimetres above to effectively apply pressure on the two welded metallic sheets during the welding process.

The top side of the plasma apparatus (1) comprises inlet with two cylindrical telescopic internal (1a) and external (1b) elements/assemblies. The internal telescopic element/assembly (1a) is inserted into an externally matched cylindrical assembly/element, which is composed of two parts (1f) and (1f'). These two parts, (1f) and (1f'), are mechanically locked with a cylindrical flange element (1e) around the internal telescopic element (1a), which is embedded inside it, with a plurality of screws (1e'). Furthermore, the top side of the assembly, which comprises parts (1f) and (1f'), has a threaded area at its top external side, and is mechanically attached to the internal telescopic element (1a), with corresponding internal threaded side of the circular flange (1c).

A special frame housing element (6), is configured to assemble the central parts of the plasma source apparatus (1) and the MAG welding apparatus (2), resulting in an efficient maintenance housing element which provides mechanical protection for the apparatus central parts. The frame apparatus comprises an additional element (7) at its edge, which embeds a small water container which is used as a cooling medium or reservoir for the welding head. The container (7) is also used for concentrating the MAG gases close to the welding spot location. The water container, not shown in the figure, is connected with two metallic water pipes (4c, 4c') to the outlets of the water pipe entry elements (4a, 4a'). The frame housing element (6) is mechanically connected to a container (7) with flange adapting elements (8a, 8b) and mediator part (9) that attaches these parts with its two corresponding clips (9a, 9b), respectively. The water pipes entry elements (4, 4') are mechanically connected with a connector metallic element (4b) to the adapting flange elements (8a).

The clips (9a, 9b) are specially configured to shift down the magnetic field which manipulates the plasma close to the welding spot in order to efficiently subtract and minimize mutual disturbances and unwanted crosstalk between the plasma etching and the MAG welding processes. The central part of the MAG welding and plasma source apparatuses (1, 2) is embedded inside the corresponding frame parts (6a, 6b), where their bottom edge-side parts are embedded inside parts (7b) and (7a) below edge bottom (7), respectively. The functional outlets of the MAG welding torch and plasma source apparatuses are positioned in their corresponding outlets (2d, 1d). The whole assembly is mechanically held together with a plurality of screws (6a'), (6b') and (9a').

At its top side, the MAG welding apparatus (2) is inserted into a circular base element assembly (2c) and is attached with a circular corresponding flange element (2b), which is screwed on top of base element (2c), enabling a modification of the MAG welding apparatus vertical location with respect to the frame part (6b). The base element assembly (2c) is connected to the frame part (6b) with a circular flange element (2e). The whole assembly is locked to the related frame part (6b) with a plurality of screws (6b'). The frame part (6) assembly enables to carry the plasma source apparatus (1) and MAG welding apparatus (2) and further align them along two different directions, with further optional tuning of their targets to coincide at the welding geometrical point.

The pressure foot module (3) is connected to the plasma source assembly part (1b) with a tube shape base element (5). The base element (5) is connected to the top side of the plasma source assembly (1) with two flanges (5a, 5b), which are mechanically locked to its tube shape top side with two screws (5a', 5b'). The pressure foot apparatus is connected to a base element (5) with a base supporting element (3a), which further comprises an axle element (3a'), configured to hold the foot pressure apparatus handle part. The foot pressure handle, comprises a plurality of assemblies (3b)-(3e), which are interconnected with a plurality of flexible joints (3b', 3d'), and is attached to the axel part (3a') and can rotate around it. This design enables to further modify the angle of the foot pressure edge parts (3g, 3g') and its vertical location with respect to the top planes of the welded metallic sheets. The foot element of the pressure foot apparatus, shown in a perspective side-view image in FIG. 1B, has a shape of two fingers (3g) and (3g'), which are connected at their edges with a rectangular metallic sheet element (3h). This pressure foot module enables both to apply an effective pressure on the top welded metallic sheets and further an open free-space passage of the welding apparatus torches and plasma source outputs to the welded spots which is located between the two welded metallic sheets. The foot fingers (3g) and (3g') are connected to its base part (3f) with a flange element (3f'), where its base part (3f) is connected to handle part element (3e) with mediator flange element (3e'). In another embodiment of the present invention, flange element (3e') contains an axel which enables the foot pressure element to rotate around a vertical plane with respect to its corresponding handle part. Finally, this design of the foot pressure element enables to modify the foot pressure orientation and height with respect to the workpiece metallic sheets, welding torch and plasma sources. In addition, it also enables to selectively apply the pressure on the metallic workpiece comprising the metallic sheets.

Figure 1C:
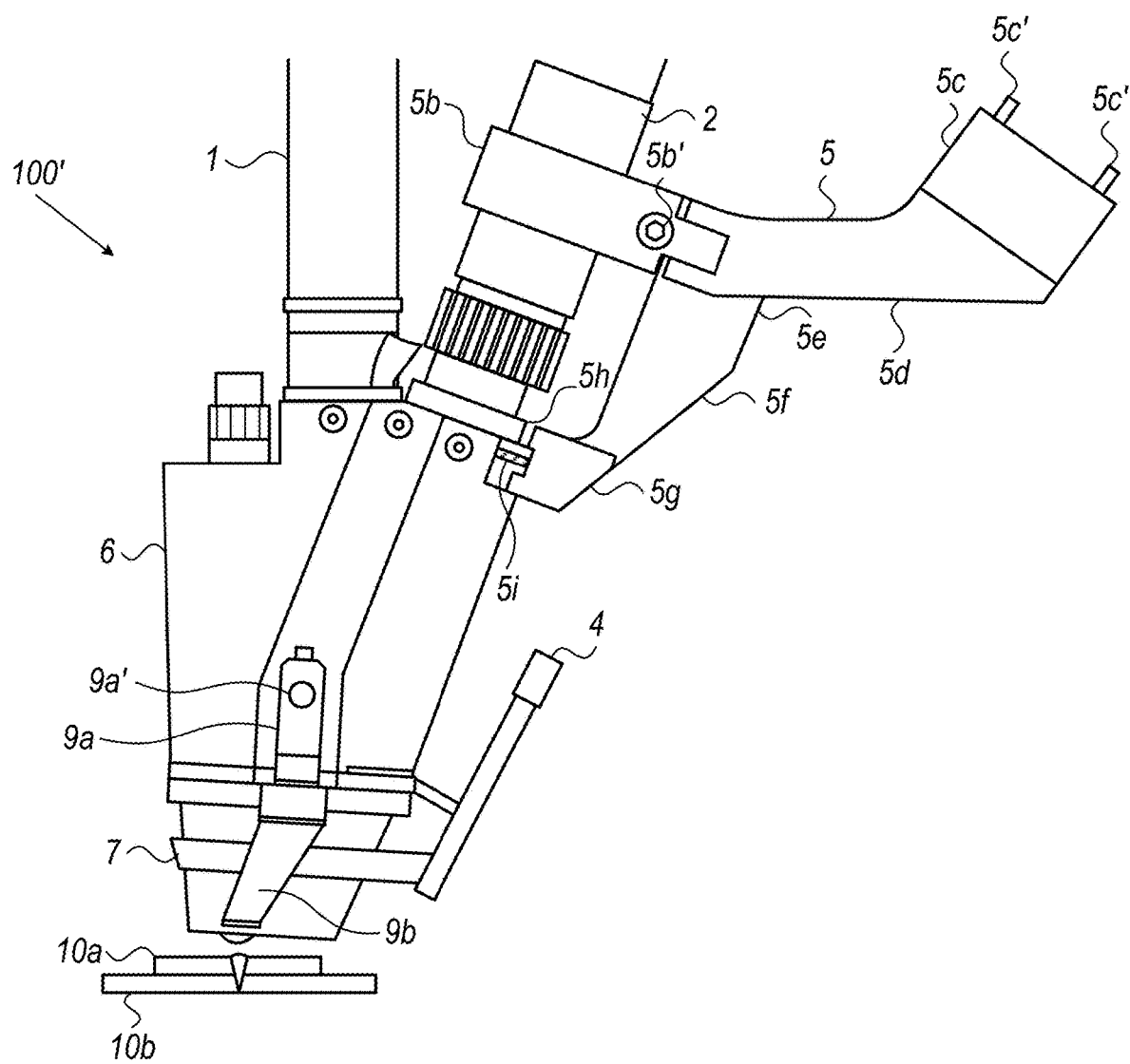
Figure 1D:
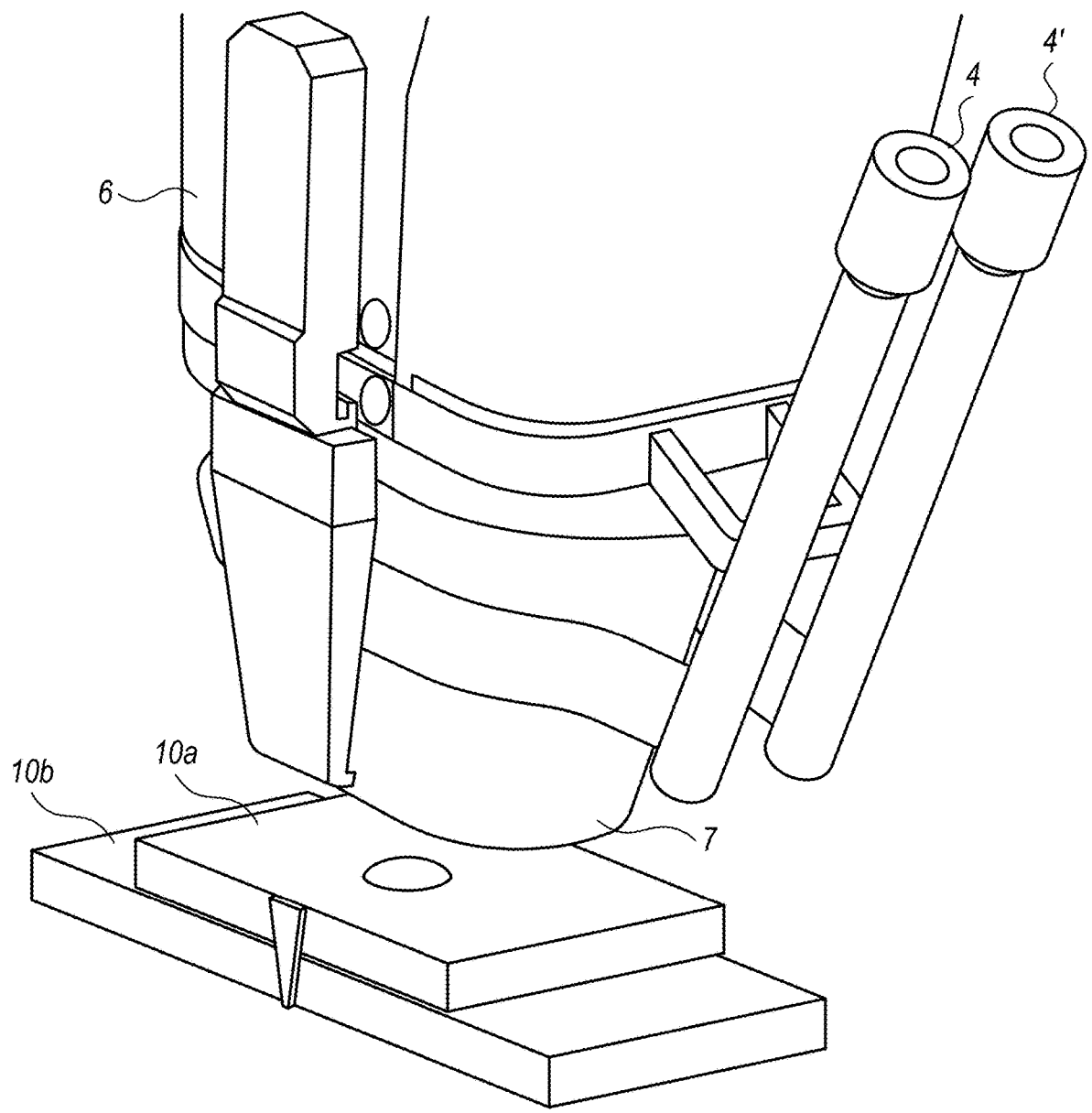

FIG. 1C illustrates a side-view of the spot welding apparatus (100') in another preferred embodiment of the present invention. FIG. 1D illustrates a side-perspective view zoom-in image of the spot welding apparatus illustrated in FIG. 1C. In this setup the spot welding apparatus comprises the inlet and related adaptors for plasma source apparatus (1) for creating holes in the welded metallic sheets (10a, 10b) and the inlet and related adaptor for the MAG welding apparatus (2) comprising a welding torch and a gas source for shielding with inert or semi-inert gases which protect the welded working place. In this setup the spot welding apparatus (100') performs the welding of the sheets without foot pressure as shown in FIG. 1A-B. As shown in FIG. 1C, the spot welding apparatus is assembled with a carrier frame part (5) with a particular design comprising a "U-shape" handle part that attaches the carrier to the spot welding apparatus with mechanical connection with a robotic handling arm, a vehicle or another transport means. The U-shape handle part is composed of three elements (5e, 5f, 5g) and attached to the MAG welding adaptor (2) at its top side with element (5e) by a flange element (5b) which and mechanically attached by the corresponding screw (5b'). At is bottom side it is connected with element (5g), which is connected to another flange element (5h) and attached with another screw (5i). The handle part is attached at its one side to an external robotic arm comprising two elements (5d, 5c) with screws (5c'), and at the distal side of the "U-shape" handle part.

Figure 2A:
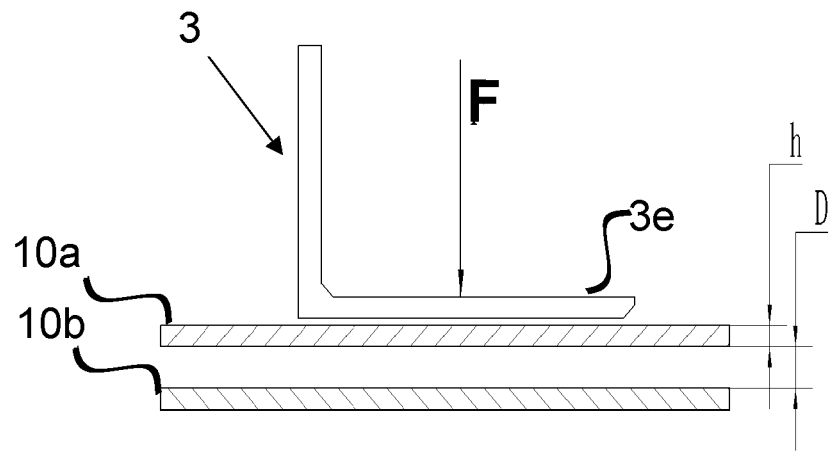
FIGS. 2A-B illustrate two cross-sectional views of the "pressure foot" apparatus of the spot welding apparatus and two welded metallic sheets with and without an applied mechanical pressure.
Figure 2B:
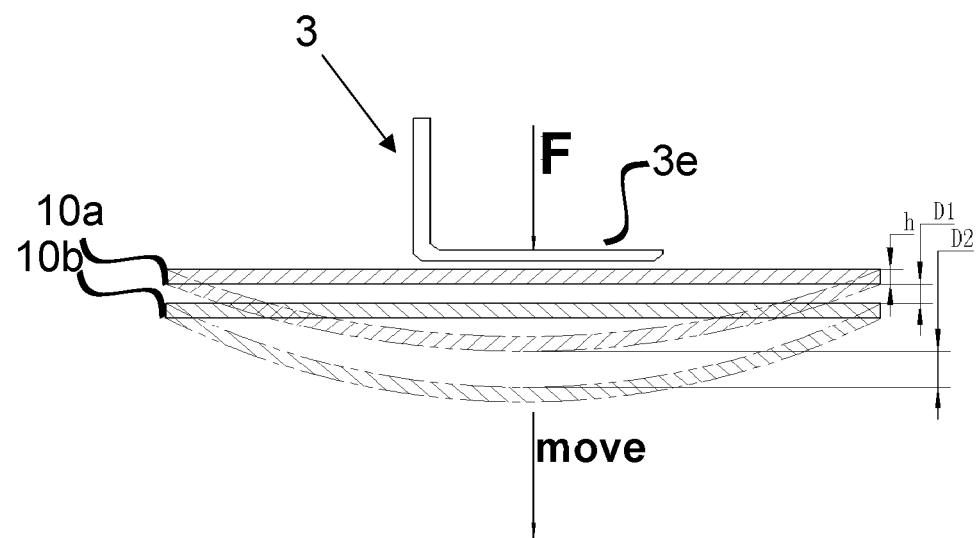

FIG. 2A illustrates cross-sectional view of the configuration of the foot pressure module (3) with the top and bottom parallel metallic sheets (10a, 10b) to be welded together. In this illustration, the metallic sheets have a thickness, h, a separation interior/intermediate vertical separation gap D, where F is force vector direction applied by the pressure foot apparatus in a vertical direction with respect to the metallic sheet planes. FIG. 2B shows the configuration of the foot pressure module (3) with the top and bottom pre-welded metallic sheets (10a, 10b) with the foot pressure apparatus (3), wherein ($D_1$, $D_2$) are the vertical separation gaps with and without the applied pressure. This model assumes that the parallel metallic sheets are mechanically held together at certain point(s) of contacts, lines or planes, not shown in the figure.

FIG. 2B also shows that by applying an external force, F, and related pressure, the two metallic sheets are bent together, where their intermediate distance, marked also as the vertical separation gap, is modified from $D_1$ to $D_2$, respectively. Hence, with a sufficiently high pressure and force, F, it is possible to reach a smaller vertical separation gap $D_2 > D_1$ which is required for the spot welding process. It is highly important to apply sufficiently high mechanical pressure, where in case where the applied pressure is not sufficiently high unwanted distortions of metallic sheets MAGht result, which can harm the spot welding process quality and or integrity.

In what follows, a detailed description of several configurations and timing sequences is provided for the spot welding apparatus for "round shape" and/or "linear stitch" shape welding architectures, particularly for the MAG welding and plasma apparatuses, and the robotic transport means. The configurations and timing sequence of the corresponding welding process are examples with reference to the accompanying drawings in several preferred embodiments of the present invention without limiting the scope of the present invention. Moreover, the process sequences are designed according to the following guideline rules:

The plasma source apparatus is at the beginning of the process.

The end of one operation and one specific apparatus do not have to be fully synchronized with the beginning of another and can be delayed or advanced to the corresponding successive operation and related apparatus.

Figure 3A:
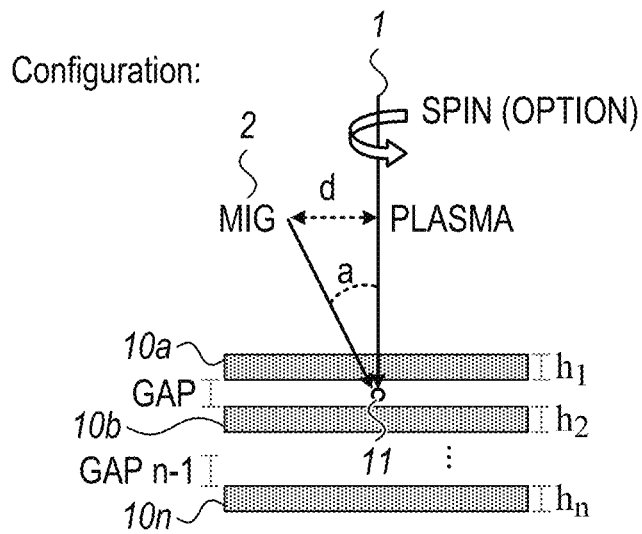
FIGS. 3A-B illustrate side-view diagrams of the spot welding apparatus setup for a "round spot" shape welding architecture with the timing sequences graphs of the process by the welding MAG and the plasma sources apparatuses.

FIG. 3A illustrates a front-view illustration of the spot welding apparatus setup for "round shape" spot welding architecture in one preferred embodiment of the present invention. This spot welding apparatus comprises the plasma source (1), welding MAG (2) and foot pressure (3) apparatuses, not shown in this figure. In this configuration, the MAG and plasma source axes are positioned to coincide at the center of the vertical gap, between the two parallel metallic sheets to be welded to each other. This gap is also the welding spot geometrical location (11). The plasma apparatus (1) and MAG (2) may also be configured to spin around its longitudinal axis of rotation for complete formation of the hole to which the welding metal is introduced with the MAG. Particularly, the rotation of the plasma apparatus around its axis ensures the desired dimensions and aspect ratio of the hole, discarding debris and residues and smoothing edges where the rotation of the MAG is used to achieve a complete filling of the welded hole which has been initially created by the plasma.

Figure 3B:
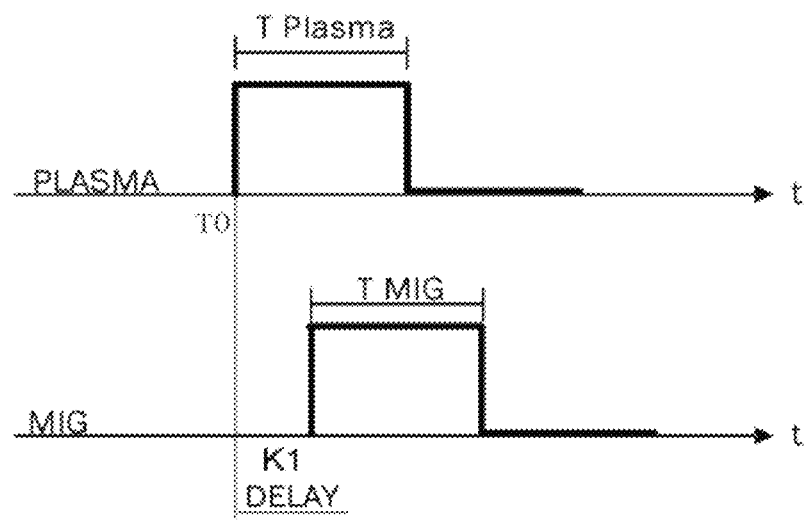

FIG. 3B illustrates graphs of a welding process timing sequences of the welding MAG and plasma source apparatuses.

Such timing sequences are designed for "round shape" spot welding architecture and executed with the robotic carrier and control systems, comprising the following steps:

The plasma source apparatus is turned on at T0.

The plasma source apparatus creates an opening, over a time operation period of T_Plasma, in the upper surface of the top metallic sheet (10a) two adjacent, vertically separated metallic sheets or through the n−1 top metallic sheets for a stack of n adjacent, vertically separated metallic sheets (10a-10n) or through the whole metallic stack comprising of a plurality of metallic sheets.

The MAG welding apparatus is turned on at T0+ΔT1, where ΔT1 is the corresponding time delay relative to the plasma.

The MAG welding apparatus process fills the hole and the gap with welding material, over a time operation period of T_MAG.

The sequence, timing, power input and process parameters are optimized by the algorithm detailed above to provide a clean, strong and a reliable weld.

Furthermore, the MAG welding apparatus is configured to rotate around the plasma axes to improve filling and spot integrity and strength or to cover a large spot area.

Figure 4A:
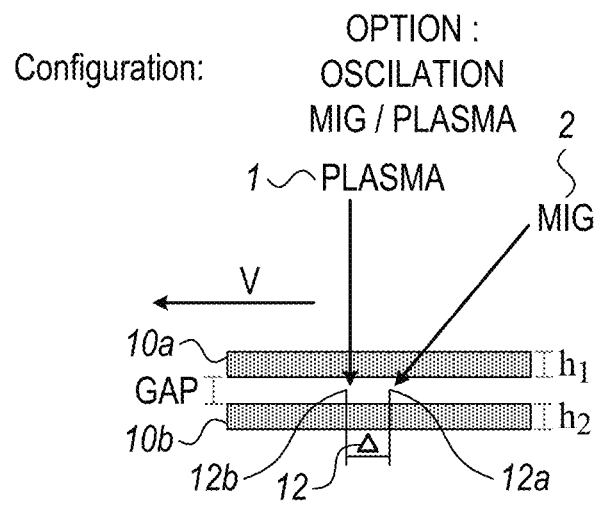
FIGS. 4A-G illustrate side-view diagrams of optional configurations of the spot welding apparatus and related method for "linear stitch" shape welding architecture with the related time sequence graphs of the welding process by the welding MAG and plasma sources apparatuses and robot carrier speed.

FIG. 4A shows a side-view diagram of the spot welding apparatus setup for a "linear stitch" shape welding architecture in another preferred embodiment of the present invention. The spot welding apparatus comprises the plasma source and MAG welding apparatuses (1), (2) and foot pressure apparatus (3), not shown in this figure. The welded metallic workpiece comprises at least two metallic sheets (10a, 10b) with related widths ($h_1$, $h_2$) separated by a vertical separation gap, marked as GAP. In this configuration, the welding spot apparatus is transported by a robotic arm travelling in a velocity, V, on a vehicle or any other transportation means along the vertical direction with respect to the two metallic sheets. In a further embodiment of the present invention, the Plasma and MAG axes are positioned with an optional separation distance (12), A, where their corresponding spots are located at the geometrical locations (12a, 12b), respectively, at the center of the vertical gap between the two parallel pre-welded metal sheets. Hence, they meet at the same point of welding due to the geometry of their location. The welding stitch formation can be considered as a continuous sequential series of welded spots, which form the linear stitch geometrical shape. To achieve this goal, the transport means, comprises a carrier robotic arm or a vehicle transport means, which carries the spot welding apparatus with respect to the two welded metallic sheets along the corresponding vertical linear stitch line.

Figure 4B:
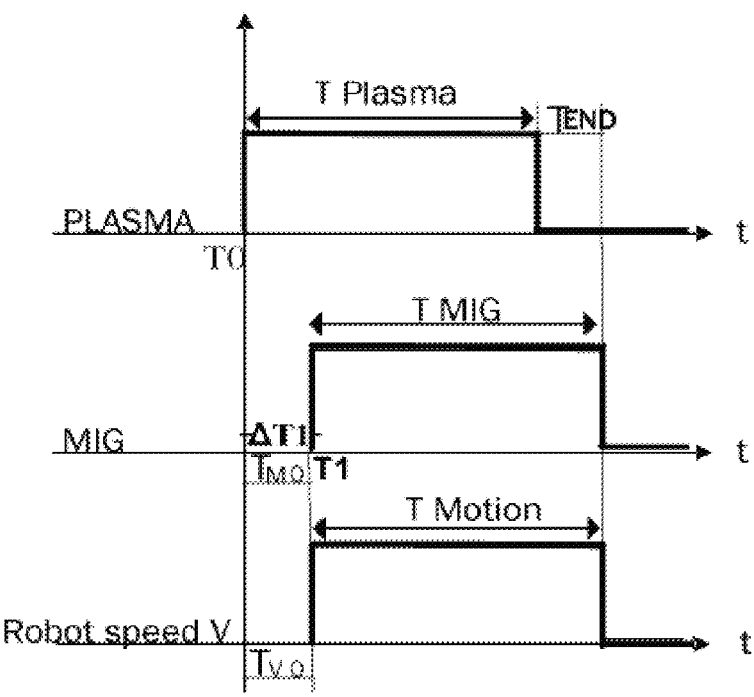

FIG. 4B illustrates the corresponding graphs of welding process timing sequences of the MAG welding and plasma sources apparatuses and the robotic carrier velocity/speed, V, along the welded seam direction. The welding process timing sequences of the welding MAG and plasma sources apparatuses, designed for a "linear stitch" welding architecture, comprise the following steps, shown in FIG. 4B:

The robot/system is located above the desired start point.
The plasma source apparatus is turned on at T0 for a time period of T_Plasma.
The plasma source apparatus creates an opening in the upper surface (10a) or through a metallic stack (10a-10n) comprising a plurality of metallic sheets, in case of more then two metallic sheets.
The MAG welding apparatus is turned on at T1=T0+ΔT1 and operates over a time period of T_MAG, where ΔT1 is the time delay, relative to the plasma, marked also as $T_{V0}$.
The MAG welding apparatus fills the opening and gap with a welding material.
The robot moves along the seam trajectory and operates over a time period of T_Motion after a time delay ΔT1.
The plasma source and MAG welding apparatuses continue to operate, where the plasma source apparatus leads the MAG welding apparatus along the welding trajectory.
The plasma source apparatus stops upon arriving at the end point.
The MAG welding apparatus and robot continue to move and fill further over a time Tend until the MAG welding apparatus is positioned at the end point and the robot travels the Delta distance, Δ.
The sequence, timing, power input and process parameters are optimized by the algorithm to provide a clean, strong and reliable weld.

In a further preferred embodiments of the present invention, one or e several of the following synchronization rules and corresponding relations between the different time scales detailed above can be applied to the welding process sequence and related apparatuses:
 i. ΔT1=TV0=TM0.
 ii. T_MAG=T_Motion.
 iii. T_MAG=T_Plasma.
 iv. T_Plasma=T_Motion.
 v. T_Plasma+Tend=T_MAG+TV0.
 vi. T_Plasma+Tend=T_Motion+TM0.

Figure 4C:
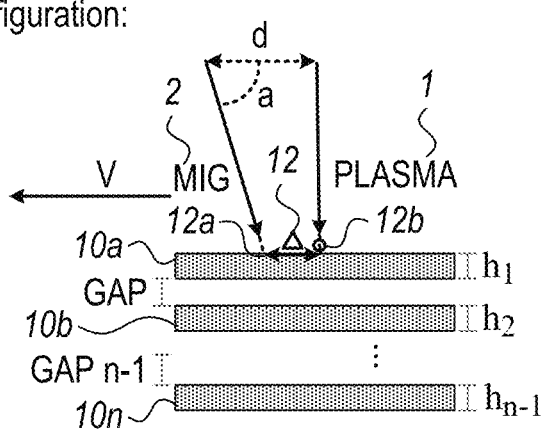

FIG. 4C illustrates a side-view of another optional diagram of the setup of the spot welding apparatus for a "linear stitch" shape welding architecture. The spot welding apparatus comprises plasma source and MAG welding apparatuses (1), (2) and foot pressure apparatus (3), not shown in the image. The welded metallic workpiece comprises a stack of at least two metallic sheets (10a), (10b-10n) with related widths ($h_1$), ($h_2$-$h_n$) separated by related vertical separation gaps, marked as ($GAP_1$), . . . ($GAP_{n-1}$). In this configuration, the plasma and MAG apparatus axes are separated by a lateral distance (d), where their related axes are separated by angle (a, the actual angle between the plasma and MAG is 90°-a). The optional separation distance (12), Δ, of the metallic sheets between the spots are located at geometrical locations (12a, 12b), respectively, optionally at the center of the vertical gap between the two parallel pre-welded metallic sheets (10a), (10b-10n). In this configuration, the welding spot apparatus is transported at a velocity, V, by a vehicle or any other transportation means along the vertical direction with respect to the metallic sheets. The transport means, comprises a carrier robotic arm or a vehicle transport means, which carries the welding spot apparatus with respect to the two welded metallic sheets along the corresponding vertical linear stitch line.

Figure 4D:
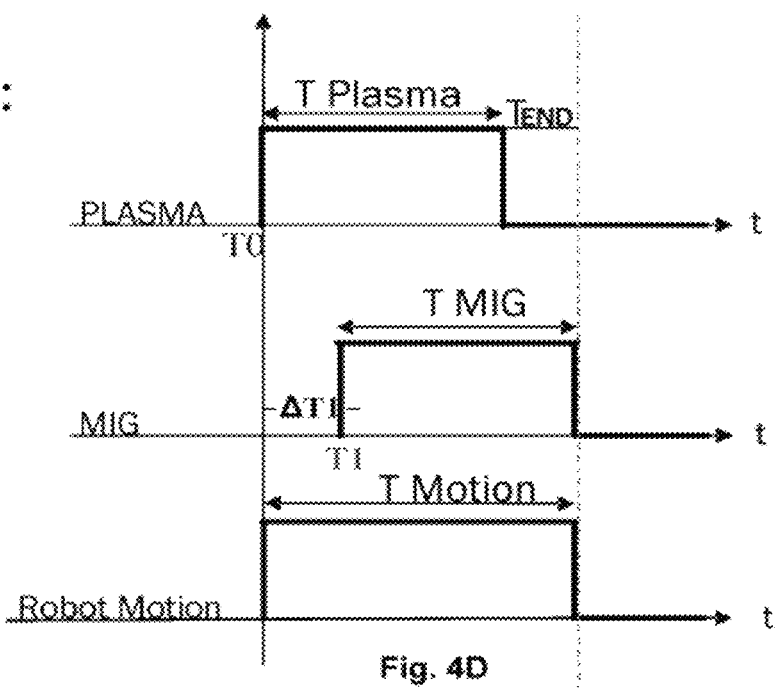

FIG. 4D illustrates the corresponding graphs of welding process timing sequences of the welding MAG and plasma sources apparatuses and the carrier robotic velocity/speed, V, along the welded seam direction. The welding process timing sequences are designed for a "linear stitch" welding architecture, as shown in FIG. 4D, and comprise the following steps: the robot/system is located above the desired start point.

The plasma source apparatus is turned on at T0, operating over a time period of T_Plasma.
The robot starts to move at T0+$T_{V0}$ along the seam trajectory, operating over a time period of T_Motion, where $T_{V0}$ is the delay time of the robot movement with respect to the turn on time of the plasma The graph and related sequence represent a certain specific case of $T_{V0}$=0.
The plasma source apparatus creates an opening hole in the upper surface of the top metallic sheet (10a) or through a stack of metallic sheets, in case of more than two metallic work sheets, comprising a plurality of metallic sheets (10a-10n).
The MAG welding apparatus is turned on at T1 and operates over a period of T_MAG, where ΔT1 is the delay time of the MAG turn on time with respect to the plasma turn on operation time, i.e. T1=T0+ΔT1.
The MAG welding apparatus fills the opening and gap with a welding material.
The plasma source apparatus and MAG welding apparatus continue to operate, where the plasma source apparatus leads the MAG welding apparatus along the welding trajectory.
The plasma source apparatus stops upon arriving at end point.
The MAG welding apparatus and robot continue to move further over a time period Tend and fill until the MAG welding apparatus is positioned at the end point until the robot travels the linear stitch trajectory with longitudinal diameter of delta, Δ.
The sequence, timing, power input and process parameters are optimized by the algorithm to provide a clean, strong and reliable weld.

In a further preferred embodiments of the present invention, one or e several of the following synchronization relation rules between the different time scales detailed above can be forced on/applied to on the welding process sequences:
 i. T1=T0+ΔT1.
 ii. T_MAG=T_Plasma.
 iii. T_Plasma+Tend=T_MAG+ΔT1.
 iv. T_Plasma+Tend=T_Motion.
 v. $T_{V0}$=0

Figure 4E:
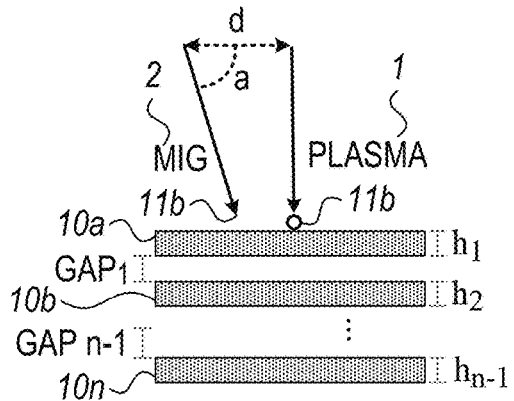
Figure 4F:
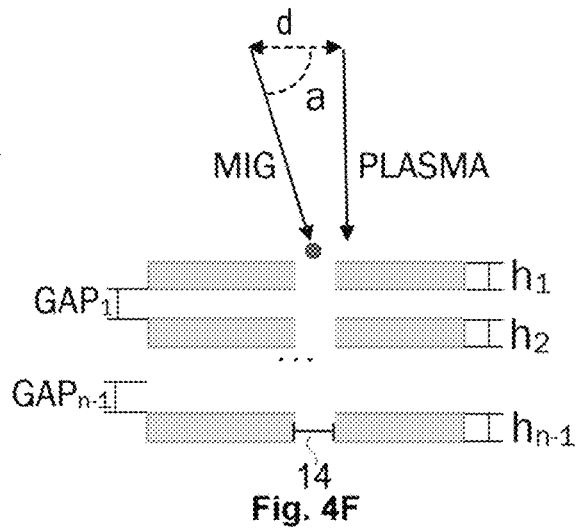

The dynamic spot welding and related states for "liner stitch" architecture for the MAG welding and plasma apparatuses is illustrated in FIGS. 4E-F. The spot welding configuration, shown in FIG. 4E, is similar to the one shown in FIG. 4C.

Figure 4G:
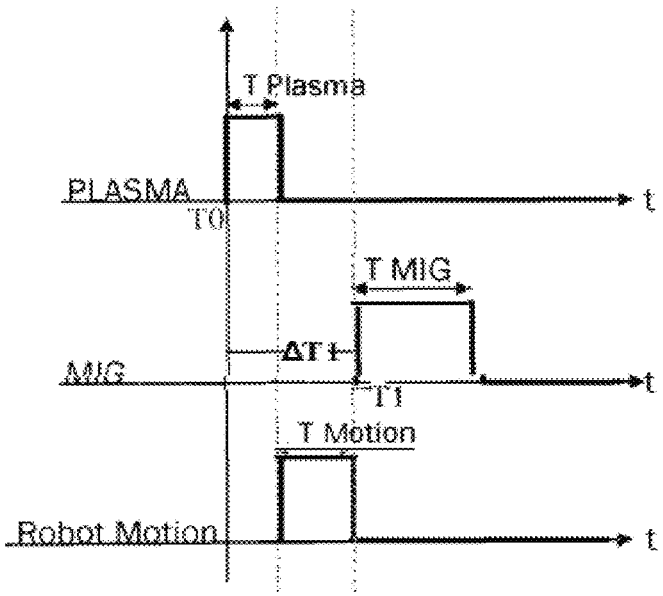

FIG. 4G illustrates the corresponding graphs of welding process timing sequences of the MAG welding and plasma sources apparatuses and carrier robotic velocity/speed, V, along the welded seam direction. The sequences are designed for a "linear stitch" welding architecture, shown in FIG. 4D, which comprises the following steps:

The robot/system is located above the desired start point.
The plasma is turned on at T0.
The plasma creates an opening in the metallic sheets over a time operation period of T_Plasma.
The robot moves along the seam trajectory at time T2 over a time operation period of T_Motion.
The MAG is turned on at T1=T0+ΔT1 and operates over time operation period of T_MAG, where ΔT1, is the delay time of the MAG turn on time with respect to the plasma turn on operation time and it depends mainly on, d, which is the inter-distance between the MAG and plasma contact point on the workpiece and also on the robot velocity, V.
The MAG apparatus fills the opening and gap with a welding material.
The plasma and MAG continue to operate (plasma leading the MAG) along the trajectory.
The plasma stops upon arriving at end point.
The MAG and robot continue to move and fill until the robot travels the d distance and the MAG is positioned at end point.
The sequence, timing, power input and process parameters are optimized by the algorithm to provide a clean and strong weld.

In a further preferred embodiments of the present invention, one or e several of the following relations between the previous different time scales can be forced on/applied to the welding process sequences:
  i. ΔT1=T_Plasma+T_Motion.
  ii. T2=T0+Plasma.

In a further embodiment of the present invention, the MAG or plasma is configured to oscillate along the stitch axes to improve filling and spot integrity and strength or cover a large spot area. In still a further embodiment of the present invention, the MAG welding apparatus is configured to rotate around the plasma axes in a configuration designed for a "linear stitch" welding architecture to improve the filling and spot integrity and strength or cover a large spot area. In a further embodiment of the present invention, the MAG welding apparatus is configured to rotate in a certain frequency around the vertical direction with respect to the plasma axis or around another axis, which is not parallel to the plasma axis, while moving in a velocity, V, along the welded seam.

In another particular embodiment of the present invention the process may utilize a magnetic field to minimize interactions between the MAG and Plasma arcs and stabilize the process.

In another embodiment of the present invention, designed for a "round spot" welding architecture, both the MAG welding and/or plasma source apparatuses are configured to rotate around the welded spot, where their axes are positioned to coincide at the center of the vertical gap, between the two parallel and adjacent metallic sheets to be welded. The related configuration is presented in FIGS. 5A-B.

Figure 5A:
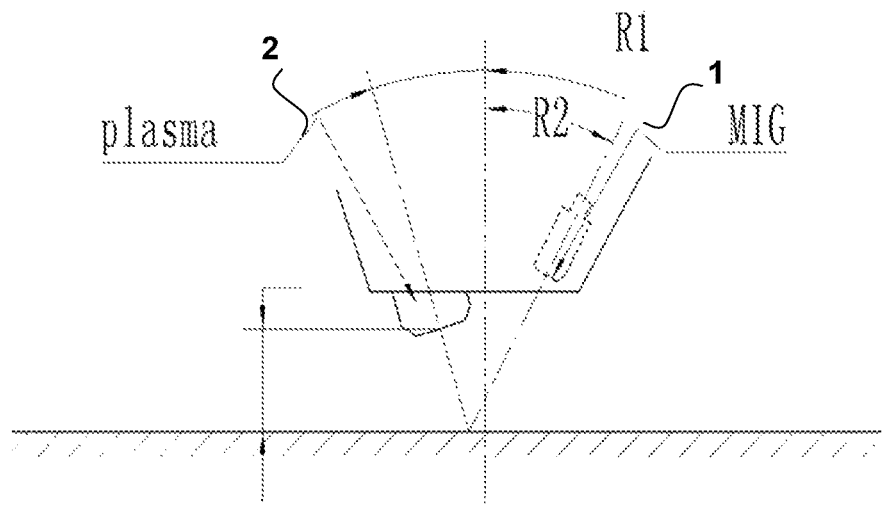
FIGS. 5A-B illustrate a side-view diagram of the spot welding setup for a "round spot" shape welding architecture, in which rotational amplitude movements is applied for the welding MAG and the plasma source devices around the welded spot, with timing sequence graphs of the welding process by the welding MAG, including the shielding gas source and the plasma source.
Figure 5B:
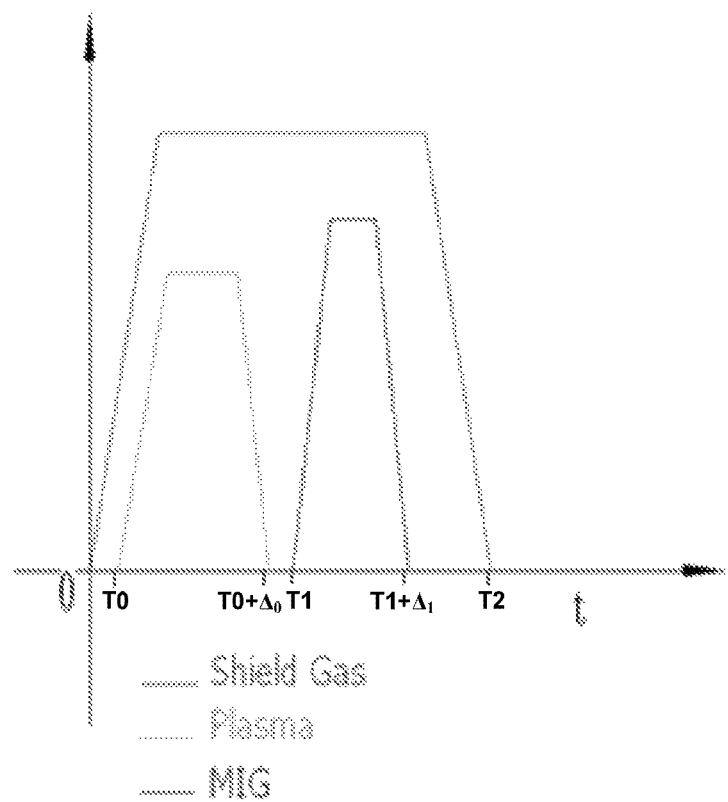

FIGS. 5A-B illustrate a front-view diagram of the spot welding setup, in which rotational movements are applied to both the welding MAG and plasma source apparatuses around the welded spot with the corresponding timing graphs of the welding process sequences including the shielding gas source. This configuration is designed for a "round shape spot" welding architecture. FIG. 5A shows the configuration in which the MAG welding apparatus rotates in an amplitude radius, $R_1$, and certain frequency, where the plasma apparatus rotates in an amplitude radius, $R_2$, in opposite phase at the same frequency. The timing sequence of the welding process is presented in FIG. 5B and comprises the following steps:

The MAG shielded gas is turned on in the beginning of the process at T=0 and remained in this condition over the entire welding process cycle of T=T2.
The plasma source apparatus is turned on at T0, creating an opening in the upper surface at the top metallic sheet in one or several rotation cycles.
The plasma source apparatus is turned off at time $T0+\Delta_0$, where $\Delta_0$ is the rotation cycle time of the plasma source apparatus.
The MAG welding apparatus is turned on at time T1, forming a weld in the opening in the upper surface at the top metallic sheet in one or several rotation cycles.
The MAG welding apparatus is turned off at time $T1+\Delta_1$, where $\Delta_1$ is the rotation cycle time of the plasma source apparatus.

In a further embodiment of the present invention, rotational movement is applied to both the MAG welding apparatus and plasma apparatus with similar configuration timing sequences as presented in FIGS. 5A-B for "linear stitch" shape welding architecture. In one embodiment of the present invention, the MAG apparatus welding head is configured in various geometrical shapes for yielding a spot with different geometrical spot shapes. In a further embodiment of the present invention, the MAG and plasma head are configured to rotate simultaneously around the same spot or successive spots, wherein the plasma source can move laterally along the welded seam with respect, or along, different directions.

Figure 6A:
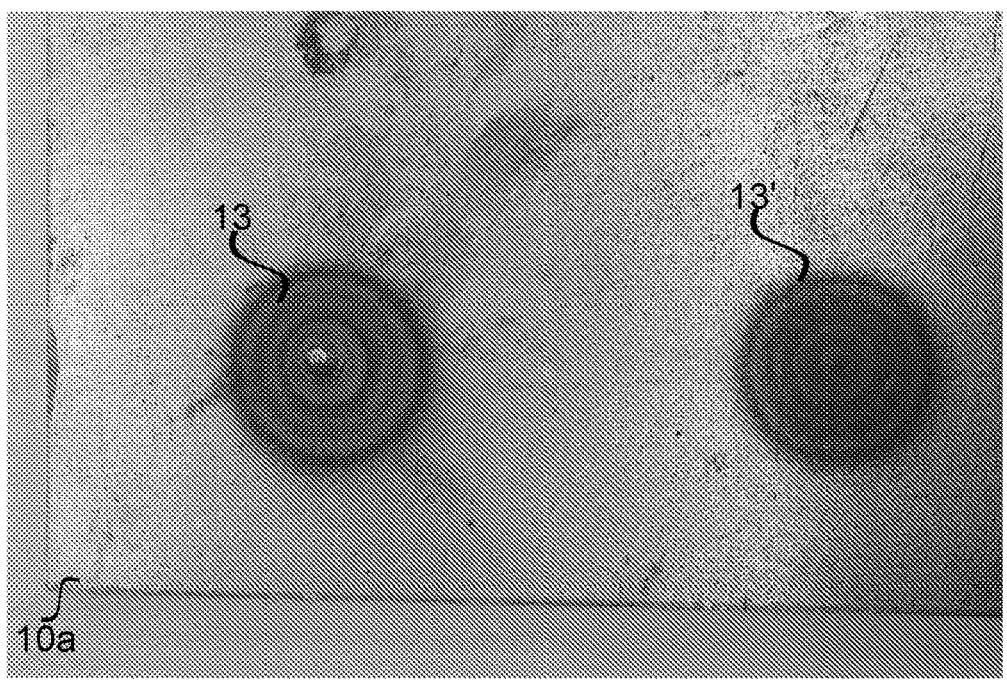
FIGS. 6A-B show top and side perspective view images of two metallic coupon/sheet samples, welded by the spot welding method and apparatus of the present invention.
Figure 6B:
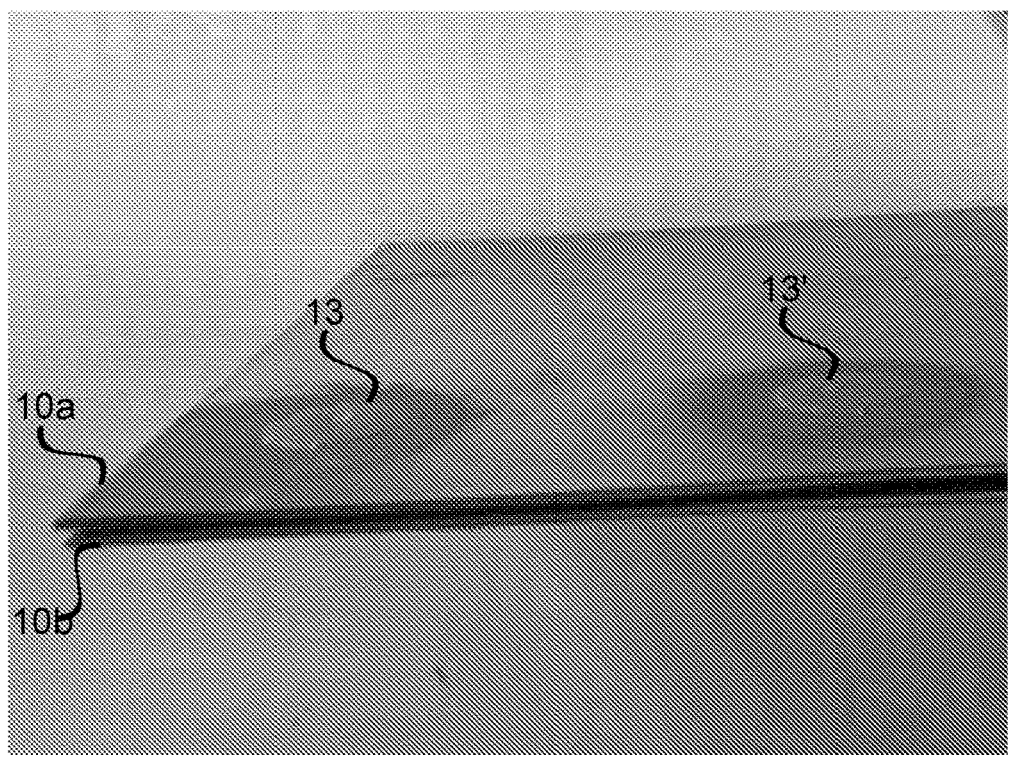

To demonstrate the spot welding method, two metallic coupons/sheets along the two different locations are close to the edge of the metallic sheets. FIGS. 6A-B show a top and a side perspective-view images of two metallic coupon/sheet samples (10a, 10b), which were welded by the spot welding method at two different locations (13, 13') close to the edge of the metallic sheets. The circular welded spots are shown in these images.

The invention claimed is:

1. A spot welding apparatus for welding metallic sheets together comprising:
  a Metal Inert Gas (MIG) or MAG welding apparatus comprising a welding torch and a shielding inert or semi-inert gases gas source configured to protect a welded working place;
  an apparatus for creating holes in at least one of said welded metallic sheets;
  a foot apparatus for applying pressure configured to apply pressure to said metallic sheets; and
  at least one frame part for assembling said Metal Inert Gas (MIG) or MAG welding apparatus, and apparatus for creating holes, and said foot apparatus for applying pressure.

2. The spot welding apparatus according to claim 1, wherein the foot apparatus for applying pressure is configured to for apply pressure before, during and after a welding process on the welded metallic sheets, wherein said frame part assembles said foot apparatus for applying pressure with said spot welding apparatus, wherein said frame part comprises a base element for assembling said Metal Inert Gas (MIG) or MAG welding apparatus and foot apparatus for applying pressure, and a second dedicated frame part for carrying together said Metal Inert Gas (MIG) or MAG welding apparatus, apparatus for creating holes and alignment apparatus, wherein said foot apparatus for applying pressure comprising a handle and foot apparatus for applying pressure components, wherein said foot apparatus for applying pressure components further comprising at least one metallic finger connected to a handle component at its edge, wherein said foot apparatus for applying pressure components comprising two straight fingers parallel each other, said fingers are connected to each other with a horizontally positioned element relative to said fingers at distal edge of said fingers.

3. The spot welding apparatus according to claim 2, wherein said foot apparatus for applying pressure is controlled and manipulated by robotic transport means configured for lateral translation and/or rotational movements of components of said spot welding apparatus.

4. The spot welding apparatus according to claim 2, wherein a plurality of flex joints are integrated with said foot apparatus for applying pressure and/or Metal Inert Gas (MIG) or MAG welding apparatus, said flex joints are configured to enable relative motion between said foot apparatus for applying pressure and/or welding torch of said Metal Inert Gas (MIG) or MAG welding apparatus.

5. The spot welding apparatus according to claim 2, further comprising a programmable foot apparatus for applying pressure controller for applying a controlled force on two adjacent welded metallic sheets, at least one pressure or force sensor integrated into said spot welding apparatus for providing feedback data on pressure parameters applied by said foot apparatus for applying pressure, and at least one distance sensor for providing feedback on vertical separation gap between adjacent metallic sheets in vicinity of a welded area, before, during and after completion of a welding process, in presence and absence of applied pressure controlled by said foot apparatus for applying pressure controller, wherein said vertical separation gap is controlled, modified and optimized before, during and after said welding process.

6. The spot welding apparatus according to claim 1, further comprising an alignment apparatus configured for aligning axes of said Metal Inert Gas (MIG) or MAG welding apparatus and apparatus for creating holes relative each other, said aligning axes passing through said foot apparatus for applying pressure, wherein said apparatus for creating holes is selected from a plasma source apparatus, high power laser cutting apparatus, thermal drilling apparatus, mechanical drilling apparatus and combinations thereof.

7. The spot welding apparatus according to claim 6, wherein said Metal Inert Gas (MIG) or MAG welding apparatus and plasma apparatus are combined into a single Hybrid Torch by using a combination of both plasma and Metal Inert Gas (MIG) or MAG arcs working simultaneously to weld said two metallic sheets on one side.

8. The spot welding apparatus according to claim 1, further comprising a controller module for controlling welding and timing sequence of operation of said Metal Inert Gas (MIG) or MAG welding apparatus, apparatus for creating holes and foot apparatus for applying pressure.

9. The spot welding apparatus according to claim 1, further comprising robotic transport means mechanically attached to said Metal Inert Gas (MIG) or MAG welding apparatus, to said plasma apparatus for creating holes and to said foot apparatus for applying pressure.

10. The spot welding apparatus according to claim 9, wherein said robotic transports means is a robotic arm.

11. The spot welding apparatus according to claim 9, wherein said Metal Inert Gas (MIG) or MAG welding apparatus and apparatus for creating holes are configured to rotate in a plurality of frequencies and a plurality of related relative phases in direction of movement of said robotic transport means.

12. The spot welding apparatus according to claim 11, wherein said apparatus for creating holes is configured to rotate in direction of said robotic transport means in a plurality of frequencies and phases and said Metal Inert Gas (MIG) or MAG welding apparatus is configured to rotate in a plurality of frequencies and phases in vertical direction with respect to direction of said robotic transport means.

13. The spot welding apparatus according to claim 1, further comprising a plurality of optical sensors and imaging apparatuses for imaging a welded seam and calculating geometrical parameters of said welded seam with and without applied pressure.

14. The spot welding apparatus according to claim 1, further comprising software for modeling and assessing impact of applied pressure on a welded seam and evaluating risk of unwanted side effects driven by applied external pressure.

15. The spot welding apparatus according to claim 1, further comprising a controller module for controlling execution of a welding process according to pre-defined process algorithms, wherein said process algorithms comprise pre-defined timing sequences for various welding parameters, for combination of heat and/or energy input applied by said spot welding apparatus and apparatus for creating holes in said metallic sheets, wherein end timing of one operation and one apparatus corresponding to said operation is delayed or advanced to a successive timing of beginning of operation of a second apparatus, wherein said timing sequences for said Metal Inert Gas (MIG) or MAG welding apparatus and said apparatus for creating holes in said metallic sheets comprise rotational movements applied for said welding Metal Inert Gas (MIG) or MAG apparatus and apparatus for creating holes around a welded spot with a related timing of said timing sequences of said Metal Inert Gas (MIG) or MAG welding apparatus, apparatus for creating holes and a shielding gas source, said apparatus for creating holes is a plasma source apparatus.

16. The spot welding apparatus according to claim 15, wherein said timing sequences of welding with said Metal Inert Gas (MIG) or MAG welding apparatus and said apparatus for creating holes in said metallic sheets is configured for a "round shape" architecture and executed by a carrier robotic control system, said apparatus for creating holes in said metallic sheets is a plasma source apparatus, wherein said apparatuses oscillate in a same or different frequency in opposite phases one relative to the other.

17. The spot welding apparatus according to claim 15, wherein timing sequences for said Metal Inert Gas (MIG) or MAG welding apparatus and said apparatus for creating holes in said metallic sheets is configured for a "linear stitch" architecture and executed by a carrier robotic control system, said apparatus for creating holes in said metallic sheets is a plasma source apparatus.

18. The spot welding apparatus according to claim 1, wherein modules and said apparatuses thereof are configured to operate simultaneously, wherein operation time periods of said modules and apparatuses partially or fully overlap.

19. The spot welding apparatus according to claim 1, wherein said spot welding apparatus further comprising at least one sensor for checking shape, color, metallic layer, topography of a welded spot as indicators of welding process quality, integrity and reliability, wherein said sensor is an optical sensor, an electrical resistive, capacitive or inductive sensor, an imaging sensor, with or without comparison to a reference image of said welded spot, a sensor based on contact or contactless tip for measuring surface electrical forces for characterizing said welded spot and welding process quality, integrity and reliability.

20. The spot welding apparatus according to claim 1, wherein said apparatus for creating holes further comprising at least one sensor for metal etch process, thereby enabling to avoid over or under etching of said metallic sheets and stop said metal etch process at bottom of said metallic sheets, wherein said sensor is selected from an optical sensor, an electrical resistive, capacitive or inductive sensor, an imaging sensor, with or without comparison to a reference image of a welded spot, a sensor based on contact or contactless tip for measuring surface electrical forces and a sensor configured to characterize metal etch processing of said hole inside metallic workpiece comprising a stack of metallic sheets.

* * * * *